US012062469B2

(12) United States Patent
Ling et al.

(10) Patent No.: US 12,062,469 B2
(45) Date of Patent: Aug. 13, 2024

(54) WATERPROOF SEALING STRUCTURE FOR A CABLE AND COMMUNICATION DEVICE

(71) Applicant: QINGDAO QIYUAN CXINKEJI CO., LTD, Shandong (CN)

(72) Inventors: Wei Ling, Shandong (CN); Chong Zhang, Shandong (CN)

(73) Assignee: QINGDAO QIYUAN CXINKEJI CO., LTD, Shandong (CN)

( * ) Notice: Subject to any disclaimer, the term of this patent is extended or adjusted under 35 U.S.C. 154(b) by 333 days.

(21) Appl. No.: 17/764,486

(22) PCT Filed: Dec. 17, 2021

(86) PCT No.: PCT/CN2021/139366
§ 371 (c)(1),
(2) Date: Mar. 28, 2022

(87) PCT Pub. No.: WO2023/082426
PCT Pub. Date: May 19, 2023

(65) Prior Publication Data
US 2023/0145759 A1 May 11, 2023

(51) Int. Cl.
*H01B 7/282* (2006.01)

(52) U.S. Cl.
CPC .................................. *H01B 7/2825* (2013.01)

(58) Field of Classification Search
CPC .... H01B 7/2825; H01B 7/282; H02G 15/046; H02G 3/088; H05K 5/0247
See application file for complete search history.

(56) References Cited

U.S. PATENT DOCUMENTS

2004/0144471 A1* 7/2004 Sikora ..................... B29C 48/09 156/87
2018/0351341 A1* 12/2018 Hutsler ................ H02G 15/196
2023/0154650 A1* 5/2023 Wang ..................... H01B 13/06 439/519

* cited by examiner

*Primary Examiner* — Hoa C Nguyen
*Assistant Examiner* — Amol H Patel
(74) *Attorney, Agent, or Firm* — Klarquist Sparkman, LLP

(57) ABSTRACT

A waterproof sealing structure for a cable and a communication device are provided. The waterproof sealing structure includes: a cable inner core, a cable sheath, fastening structures, and an actuating mechanism, wherein the cable sheath is molded by one-time pouring outside the cable inner core, the cable sheath comprises an elongated sheath and disc-shaped sheaths, the disc-shaped sheaths are molded at end portions of the elongated sheath, the end portions of the cable inner core are connected to the actuating mechanism, ends of the actuating mechanism connected to the cable inner core are open, and the disc-shaped sheaths are sealed and fastened at the open ends of the actuating mechanism through the fastening structures.

20 Claims, 2 Drawing Sheets

WATERPROOF SEALING STRUCTURE FOR A CABLE AND COMMUNICATION DEVICE

CROSS-REFERENCE TO RELATED APPLICATION

This is the U.S. National Stage International Application No. PCT/CN2021/139366, filed Dec. 17, 2021, which was published in English under PCT Article 2192), which in turn claims the priority to the Chinese patent application with the filing No. 202122740371.1, filed on Nov. 10, 2021 with the State Intellectual Property Office of China, and entitled "Waterproof Sealing Structure for a Cable and Communication Device", the contents of which are incorporated by reference herein in entirety.

TECHNICAL FIELD

The present disclosure relates to the field of waterproof cables, and in particular to a waterproof sealing structure for a cable and a communication device.

BACKGROUND ART

The waterproof sealing of a cable in the related art requires secondary treatment to achieve the sealing effect, because the cable sheath is generally made of an elastic material. The cable sheath, which is very long and has the same wire diameter, is processed at one time in the cable manufacturing process, then the cable sheath is bonded with an aviation joint through a chemical process or directly filled and sealed by a waterproof glue. The two methods can enable waterproof sealing in a certain period of time, but due to the defects that when two substances are bonded together, the bonding of the two substances is not firm and the like because of different contraction and expansion coefficients of the two different substances after long-time temperature change of alternate cooling and heating or long-time extrusion of high-pressure liquid, the two substances will be peeled off at last, and finally the waterproof sealing fails. Therefore, a waterproof sealing structure for the cable is provided, to solve the problem that the waterproof sealing effect is weakened due to the fact that the cable sheath is peeled off after being subjected to alternate cooling and heating.

SUMMARY

The present disclosure provides a waterproof sealing structure for a cable and a communication device including the waterproof sealing structure for a cable, so as to at least overcome the deficiencies in the related art.

In some embodiments of the present disclosure, a waterproof sealing structure for a cable is provided. The waterproof sealing structure for a cable may include: a cable inner core, a cable sheath, fastening structures, and an actuating mechanism, wherein the cable sheath is molded by one-time pouring outside the cable inner core, the cable sheath may include an elongated sheath and disc-shaped sheaths, the disc-shaped sheaths are each molded at an end portion of the elongated sheath, the end portions of the cable inner core may be connected to the actuating mechanism, ends of the actuating mechanism connected to the cable inner core is open, and the disc-shaped sheath may be sealed and fastened at the open ends of the actuating mechanism through the fastening structure.

In some possible embodiments of the waterproof sealing structure for a cable, each open end of the actuating mechanism is provided with an annular groove matched with the corresponding disc-shaped sheath.

In some possible embodiments of the waterproof sealing structure for a cable, an annular sealing ring is molded on an end surface of the disc-shaped sheath opposite to the annular groove, and the annular sealing ring may be configured to be in sealed contact with and matched with an inner bottom surface of the corresponding annular groove.

In some possible embodiments of the waterproof sealing structure for a cable, the thickness of the disc-shaped sheath may be greater than the depth of the annular groove.

In some possible embodiments of the waterproof sealing structure for a cable, each of the fastening structures may include a pressing block and a bolt assembly, and the pressing block may be configured to be fixed to the open end of the actuating mechanism through the bolt assembly, to realize compression to the disc-shaped sheath.

In some possible embodiments of the waterproof sealing structure for a cable, the pressing block may include a pressure dividing block and a second pressure dividing block detachably matched and connected with each other, and the first pressure dividing block and the second pressure dividing block each may be configured to be fixed at the open end of the actuating mechanism through the bolt assembly.

In some possible embodiments of the waterproof sealing structure for a cable, the first pressure dividing block and the second pressure dividing block may be configured to form a complete circular ring structure, and the cable sheath may be configured to be clamped by the first pressure dividing block and the second pressure dividing block.

In some possible embodiments of the waterproof sealing structure for a cable, the first pressure dividing block and the second pressure dividing block may be configured to form a complete circular ring structure, so as to clamp the elongated sheath between the first pressure dividing block and the second pressure dividing block, wherein end surfaces of the first pressure dividing block and the second pressure dividing block may be in contact and matched with an opposite end surface of the disc-shaped sheath.

In some possible embodiments of the waterproof sealing structure for a cable, the bolt assembly may include four bolts, and the end surfaces of the pressing block and the open end of the actuating mechanism each may be provided with screw holes, the bolts pass through the screw holes to fix the pressing block and the actuating mechanism, and meanwhile, the pressing block fixes the disc-shaped sheath in the annular groove.

In some possible embodiments of the waterproof sealing structure for a cable, end surfaces of the first pressure dividing block and the second pressure dividing block are equidistantly provided with three screw holes in a semi-circumferential direction of 180°, wherein two of the three screw holes may be located at positions where the first pressure dividing block and the second pressure dividing block are lap jointed and overlap each other, and the two screw holes where the first pressure dividing block and the second pressure dividing block are lap jointed and overlap each other may have the same axis.

In some possible embodiments, the first pressure dividing block and the second pressure dividing block may be of detachable structures.

In some possible embodiments of the waterproof sealing structure for a cable, the cable sheath may be an elastic PUR material.

In some possible embodiments of the waterproof sealing structure for a cable, the actuating mechanism may include a control cabin and an actuator, and an end of the control cabin and an end of the actuator are open; the cable inner core may penetrate through the cable sheath, and the cable inner core has one end located in the control cabin, and the other end located in the actuator; and the fastening structures may sealedly secure the cable sheath in the control cabin and the actuator.

In some possible embodiments of the waterproof sealing structure for a cable, the fastening structures may secure end portions of the cable sheath at the open ends of the control cabin and the actuator, respectively; and two ends of the cable inner core penetrating out of the end portions of the cable sheath may be inserted into the control cabin and the actuator, respectively.

In some possible embodiments of the waterproof sealing structure for a cable, the diameter of the disc-shaped sheath may be greater than the diameter of the elongated sheath; a distance between the end surface of the disc-shaped sheath and the corresponding end portion of the cable inner core may be greater than a distance between the end surface of the elongated sheath and the corresponding end portion of the cable inner core.

In some possible embodiments of the waterproof sealing structure for a cable, the fastening structures may be arranged outside the end surfaces of the disc-shaped sheaths, and the fastening structures may be configured to be in close contact and matched with the end surfaces of the disc-shaped sheaths, so that the end surfaces of the disc-shaped sheaths away from the respective fastening structures are tightly attached to the end surfaces of the control cabin and the actuator.

In some other embodiments of the present disclosure, a communication device is provided, wherein the communication device may include the above waterproof sealing structure for a cable.

The embodiments of the present disclosure may have at least the following advantages.

Compared with the prior art, the cable sheath of the waterproof sealing structure for a cable provided in the present disclosure wraps the cable inner core by one-time pouring, then peeling off of the cable sheath in the environment with high hydraulic pressure and large temperature change of alternate cooling and heating can be effectively avoided, the disc-shaped cable sheaths seal and isolate the actuating mechanism where the cable inner core is located, and the waterproof sealing of the whole side surface and the end portions of the cable inner core is realized.

In order to make the above objectives, features, and advantages of the present disclosure more apparent and understandable, preferred embodiments are specifically described below in detail in conjunction with the accompanying drawings.

BRIEF DESCRIPTION OF DRAWINGS

In order to more clearly illustrate technical solutions of embodiments of the present disclosure, accompanying drawings which need to be used in the embodiments will be introduced briefly below, and it should be understood that the accompanying drawings below merely show some embodiments of the present disclosure, therefore, they should not be considered as limitation on the scope, and those ordinarily skilled in the art still could obtain other relevant accompanying drawings according to these accompanying drawings, without using any creative efforts.

REFERENCE SIGNS OF MAIN ELEMENTS

Figure 1:
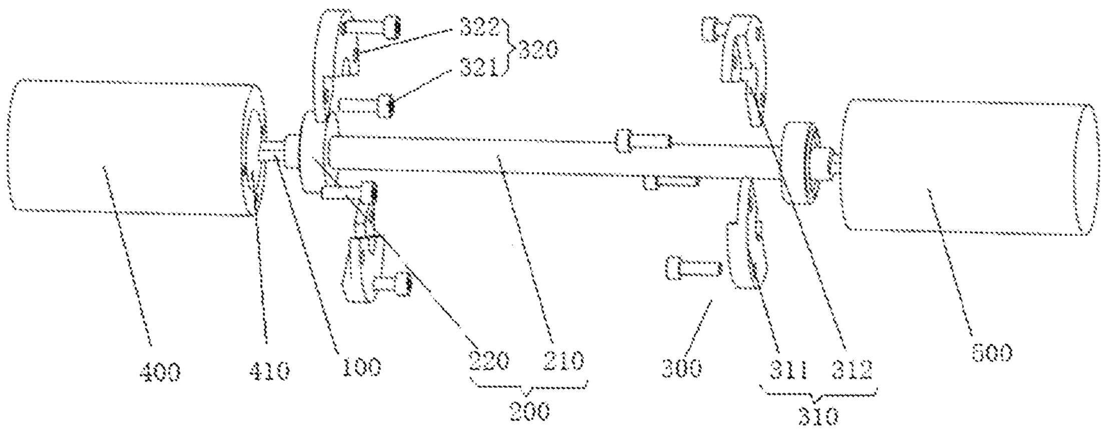
FIG. 1 shows an exploded view of a waterproof sealing structure for a cable.

100—cable inner core, 200—cable sheath, 210—elongated sheath, 220—disc-shaped sheath, 221—annular sealing ring, 300—fastening structure, 310—pressing block, 311—first pressure dividing block, 312—second pressure dividing block, 320—bolt assembly, 321—bolt, 322—screw hole, 400—control cabin, 410—annular groove, 500—actuator, 600—actuating mechanism.

DETAILED DESCRIPTION OF EMBODIMENTS

Embodiments of the present disclosure are described in detail below, and examples of the embodiments are shown in the accompanying drawings, in which like or similar signs represent like or similar elements or elements having the like or similar functions throughout the accompanying drawings. The embodiments described below with reference to the accompanying drawings are exemplary, and merely used to explain the present disclosure, but cannot be construed as limitation to the present disclosure.

In the description of the present disclosure, it should be understood that orientation or positional relations indicated by terms "center", "longitudinal", "lateral", "length", "width", "thickness", "upper", "lower", "front", "back", "left", "right", "vertical", "horizontal", "top", "bottom", "inner", "outer", "clockwise", "anticlockwise", "axial", "radial", and "circumferential" and so on are based on orientation or positional relations as shown in the accompanying drawings, merely for facilitating the description of the present disclosure and simplifying the description, rather than indicating or implying that related devices or elements have to be in the specific orientation or configured and operated in a specific orientation, therefore, they should not be construed as limitation on the present disclosure.

Besides, terms "first" and "second" are merely for descriptive purpose, but should not be construed as indicating or implying importance in the relativity or implying the number of an indicated technical feature. Thus, a feature defined with "first" or "second" may explicitly or implicitly means that one or more such features are included. In the description of the present disclosure, "multiple (a plurality of)" refers to two or more than two, unless otherwise defined explicitly and specifically.

In the present disclosure, unless otherwise specified and defined explicitly, terms such as "mount", "join", "connect", and "fix" should be construed in a broad sense, for example, a connection may be a fixed connection, a detachable connection, or an integral connection; it may be a mechanical connection, or also may be an electrical connection; it may be a direct connection, an indirect connection via an intermediate medium, or internal communication between two elements or interaction between two elements. For those ordinarily skilled in the art, specific meanings of the above-mentioned terms in the present disclosure can be understood according to specific circumstances.

In the present disclosure, unless otherwise specified and defined explicitly, a first feature being "above" or "below"

a second feature may include the first feature and the second feature being in direct contact, or the first feature and the second feature being in contact through an intermediate medium. Moreover, the first feature being "on", "above" or "over" the second feature may be that the first feature is right above or obliquely above the second feature, or merely means that the horizontal height of the first feature is larger than that of the second feature. The first feature being "under", "below" or "beneath" the second feature may be that the first feature is directly below or obliquely below the second feature, or merely means the horizontal height of the first feature being smaller than that of the second feature.

The waterproof sealing structure for a cable provided in some embodiments of the present disclosure will be described in detail below with reference to the accompanying drawings.

Figure 3:
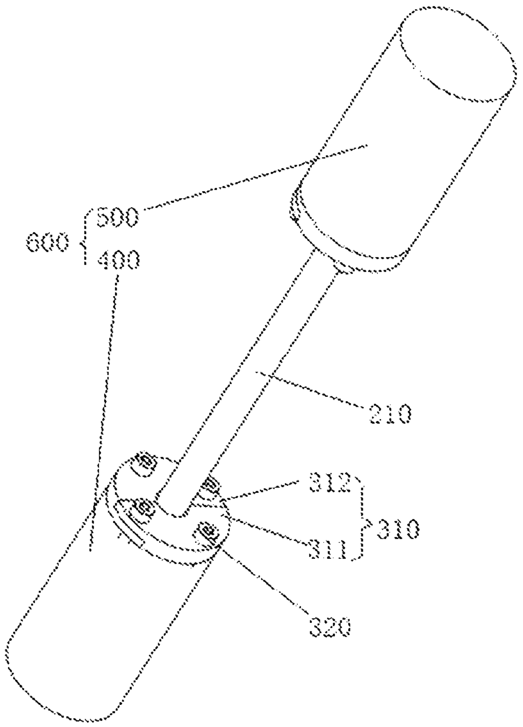
FIG. 3 shows an assembled structural schematic view of the waterproof sealing structure for a cable.

Referring to FIG. 1 and FIG. 3, the present disclosure provides a waterproof sealing structure for a cable, including a cable inner core 100, a cable sheath 200, fastening structures 300, and an actuating mechanism 600. A cable sheath 200 is provided outside the cable inner core 100, and the cable sheath 200 is of a special-shaped structure molded by pouring. The actuating mechanism 600 includes a control cabin 400 and an actuator 500, and an end of the control cabin 400 and an end of the actuator 500 are open. The cable inner core 100 penetrates through the cable sheath 200, and the cable inner core 100 has one end located in the control cabin 400, and the other end located in the actuator 500. The fastening structures 300 sealedly secure the cable sheath 200 in the control cabin 400 and the actuator 500.

In the present embodiment, optionally, the fastening structures 300 secure end portions of the cable sheath 200 at the open ends of the control cabin 400 and the actuator 500, respectively. Two ends of the cable inner core 100 penetrating out of the end portions of the cable sheath 200 are inserted into the control cabin 400 and the actuator 500, respectively.

By fixing the end portions of the cable sheath 200 at the open ends of the control cabin 400 and the actuator 500 by the fastening structures 300, the end portions of the cable sheath 200 can play a role in sealing and blocking the open ends of the control cabin 400 and the actuator 500, so that the cable inner core 100 penetrating out of the end portions of the cable sheath 200 is located in a sealed cavity, thus sealedly isolating the cable inner core 100 located in the control cabin 400 and the actuator 500 from the outside.

In the present embodiment, optionally, the cable inner core 100 is first placed in a fabricated steel cavity, and then a required sheath material is poured and formed through the steel cavity at one time, so that finally the cable sheath 200 is attached to a side surface of the cable inner core 100. As the cable sheath 200 is formed of the same material by one-step pouring processing, peeling off of the sheath due to the alternate cooling and heating of the external environment can be avoided, the water leakage risk of long-time use is reduced, and a large amount of processing time and production cost are also saved by pouring and wrapping at one time.

For the conventional cable manufacturing process, mostly, the sheath which is very long and has the same wire diameter is processed at one time, and then the sheath is directly filled and sealed with a waterproof glue. Although the above method can enable waterproof sealing in a short period of time, due to the factors that when two substances are bonded together, the bonding of the two substances is not firm because of different contraction and expansion coefficients of the two different substances after long-time temperature change of alternate cooling and heating and high hydraulic pressure environment, and the like, the two substances will be peeled off at last and the waterproof sealing effect fails. Therefore, forming the cable sheath 200 by one time pouring can reduce the occurrence of the above hidden dangers, and ensure the waterproof sealing effect of the device.

In the present embodiment, optionally, the cable sheath 200 is an elastic PUR material, and the cable sheath 200 of the elastic PUR has properties of wear resistance, cold resistance, water resistance, oil contamination resistance, and the like. Since the cable inner core 100 requires very high sealing and waterproofing requirements, the cable sheath 200 of the elastic PUR material can provide the conditions required for sealing and water prevention of the cable inner core 100. Therefore, the cable sheath 200 of the elastic PUR material can reduce the influence of the external environment on the use of the cable inner core 100, thereby greatly prolonging the service life of the cable inner core 100.

With continued reference to FIG. 1, the cable sheath 200 includes an elongated sheath 210 and disc-shaped sheaths 220. The elongated sheath 210 and the disc-shaped sheath 220 are of an integrated structure, and the cable inner core 100 penetrates out of end portions of the elongated sheath 210.

In the present embodiment, optionally, the cable sheath 200 is composed of two structures, including the elongated sheath 210 wrapping a middle portion of the cable inner core 100 and having a relatively large length, and disc-shaped sheaths 220 molded at the end portions of the cable inner core 100. The diameter of each of the disc-shaped sheaths 220 is greater than the diameter of the elongated sheath 210. A distance between the end surface of the disc-shaped sheath 220 and the corresponding end portion of the cable inner core 100 is greater than a distance between the end surface of the elongated sheath 210 and the corresponding end portion of the cable inner core 100, that is, when the disc-shaped sheath 220 contacts the end surface of the open end of the control cabin 400 or the actuator 500, the end surface of the elongated sheath 210 is located inside the control cabin 400 or the actuator 500. The fastening structures 300 are arranged outside the end surfaces of the disc-shaped sheaths 220, and the fastening structures 300 can be in close contact and matched with the end surfaces of the disc-shaped sheaths 220, so that the end surfaces of the disc-shaped sheaths 220 away from the fastening structures 300 can be tightly attached to the end surfaces of the control cabin 400 and the actuator 500.

If the end surface of the molded disc-shaped sheath 220 is flush with the end surface of the elongated sheath 210 on the same side, the position where the cable inner core 100 penetrates out of the cable sheath 200 is just the contact position of the cable sheath 200 and the end surface of the control cabin 400 or the actuator 500. On one hand, the cable inner core 100 penetrating out of the end surface of the disc-shaped sheath 220 has no cable sheath 200 to wrap the cable inner core for transition, so that the connection of the cable inner core 100 with the control cabin 400 or the actuator 500 is inconvenient, and the cable inner core 100 may be damaged. On the other hand, the cable inner core 100 is just at the position where the disc-shaped sheath 220 is contacted and matched with the control cabin 400 or the actuator 500, and if a gap is generated at the contact position, the cable inner core 100 will be directly influenced. Providing a certain interval between the end surface of the disc-shaped sheath 220 and the end surface of the elongated sheath 210 enables the cable inner core 100 to be protected.

With continued reference to FIG. 1, the end surface of the open end of the control cabin 400 and the end surface of the open end of the actuator 500 are each provided with an annular groove 410, and the annular groove 410 is matched and connected with the disc-shaped sheath 220.

In the present embodiment, optionally, when the cable inner core 100 needs to be subjected to the waterproof sealing treatment, the two ends of the cable sheath 200 with the cable inner core 100 wrapped inside are inserted into the control cabin 400 and the actuator 500 respectively, so that the end surfaces of the disc-shaped sheaths 220 are in contact and matched with inner bottom surfaces of the annular grooves 410. The outer end surfaces of the disc-shaped sheaths 220 are located outside the end surfaces of the control cabin 400 and the actuator 500, and the pressures of the fastening structures 300 can be applied to the end surfaces of the disc-shaped sheaths 220, so that the inner end surfaces of the disc-shaped sheaths 220 are tightly attached to the inner end surfaces of the annular grooves 410, facilitating improvement of the waterproof sealing effects of the control cabin 400 and the actuator 500.

Figure 2:
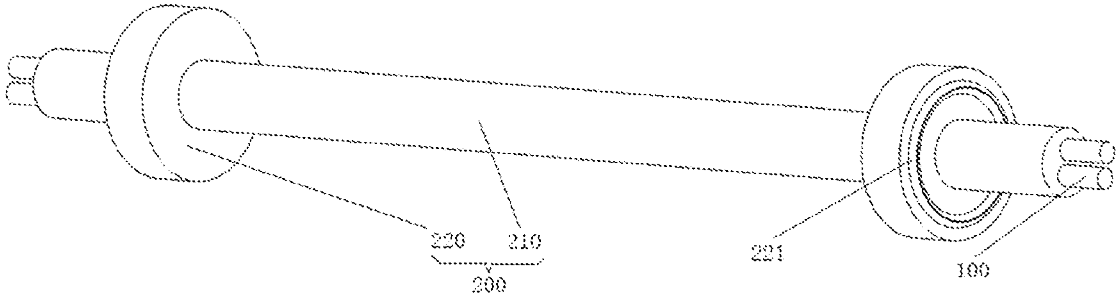
FIG. 2 shows a structural schematic view of a cable sheath and a cable inner core.

As shown in FIG. 2, an annular sealing ring 221 is molded on an end surface of each of the disc-shaped sheaths 220 opposite to the corresponding annular groove 410, and the annular sealing ring 221 can be closely attached to an inner end surface of the corresponding annular groove 410.

In the present embodiment, optionally, when the cable inner core 100 in the control cabin 400 and the actuator 500 needs to be subjected to a waterproof sealing treatment, the disc-shaped sheath 220 is first inserted into the corresponding annular groove 410, to ensure that the annular sealing ring 221 on the end surface of the disc-shaped sheath 220 is completely attached onto the inner end surface of the annular groove 410. Then, an extruding force into the corresponding annular groove 410 is generated by the fastening structure 300 for the disc-shaped sheath 220, to ensure that the annular sealing ring 221 is closely attached to the inner end surface of the annular groove 410 without creating a gap, thereby greatly improving the sealing and waterproofing performance of the device.

With continued reference to FIG. 1, each of the fastening structures 300 includes a pressing block 310 and a bolt assembly 320. The pressing blocks 310 can be respectively fixed to the end portions of the control cabin 400 and the actuator 500 through the bolt assemblies 320, and meanwhile the pressing blocks 310 tightly compress the disc-shaped sheaths 220 into the annular grooves 410.

As shown in FIG. 1 and FIG. 3, the bolt assemblies 320 each include four bolts 321, and the end surfaces of the pressing blocks 310, the control cabin 400, and the actuator 500 are each provided with screw holes 322. The bolts 321 can be matched and connected with the screw holes 322 of the pressing blocks 310, the control cabin 400, and the actuator 500, so as to fix the disc-shaped sheaths 220 in the corresponding annular grooves 410.

In the present embodiment, optionally, the end surface of each pressing block 310, and the end surfaces where the open ends of the control cabin 400 and the actuator 500 are located are uniformly arranged with four screw holes 322 along the annular shape, and the screw holes 322 are in internally threaded connection with the bolts 321. When the disc-shaped sheaths 220 at the annular grooves 410 need to be fixed, the pressing blocks 310 are firstly attached to the open end surfaces of the control cabin 400 and the actuator 500, and the screw holes 322 of the pressing blocks 310 are aligned with the screw holes 322 of the control cabin 400 and the actuator 500. Then, the bolts 321 are screwed into the screw holes 322. As the end surface of the disc-shaped sheath 220 is located outside the annular groove 410, when the bolts 321 are screwed, the pressing block 310 gradually moves toward the side of the control cabin 400 or the actuator 500, and the pressing block 310 compresses the disc-shaped sheath 220, and the disc-shaped sheath 220 and the annular groove 410 are more closely attached to each other, so that the annular sealing rings 221 separate the inner and outer portions of the control cabin 400 and the inner and outer portions of the actuator 500 respectively, thus achieving the effect of waterproof sealing on the cable inner core 100.

Figure 4:
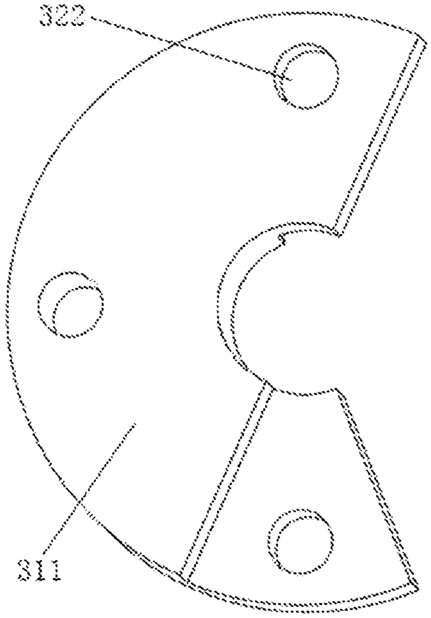
FIG. 4 shows a structural schematic view of a first pressure dividing block.

With continued reference to FIG. 1 and FIG. 4, the pressing block 310 includes a first pressure dividing block 311 and a second pressure dividing block 312 detachably matched and connected with each other, and the first pressure dividing block 311 and the second pressure dividing blocks 312 both can be fixed at the end portion of the control cabin 400 or the actuator 500 through the bolt assembly 320.

In the present embodiment, optionally, when combined, the first pressure dividing block 311 and the second pressure dividing block 312 can form a complete circular ring structure, and the elongated sheath 210 is clamped therebetween. The end surfaces of the first pressure dividing block 311 and the second pressure dividing block 312 contact and matched with an opposite end surface of the disc-shaped sheath 220. The end surfaces of the first pressure dividing block 311 and the second pressure dividing block 312 are equidistantly provided with three screw holes 322 in a semi-circumferential direction of 180°. In the above, two screw holes 322 are located at positions where the first pressure dividing block 311 and the second pressure dividing block 312 are lap jointed and overlap each other, and the two screw holes 322 where the first pressure dividing block 311 and the second pressure dividing block 312 are lap jointed and overlap each other have the same axis. When the bolt assemblies 320 fix the disc-shaped sheaths 220, the bolts 321 can pass through the screw holes 322 in the first pressure dividing blocks 311 and the second pressure dividing blocks 312, and the disc-shaped sheaths 220 cannot move relative to the control cabin 400 and the actuator 500, which helps to protect the cable inner core 100 from the outside.

In the present embodiment, optionally, as the first pressure dividing block 311 and the second pressure dividing block 312 have structures lap-jointed and overlapping each other, compared with that a common semi-circular ring structure can achieve only simple contact and cooperation, the first pressure dividing block 311 and the second pressure dividing block 312 in the present embodiment can be fixed together by bolts 321 after being engaged together. The tighter the connection between the first pressure dividing block 311 and the second pressure dividing block 312 is, the deformation is less likely to occur, the better the fastening effect on the disc-shaped sheath 220 is, and the better the waterproof sealing effect on the cable inner core 100 is.

In the present embodiment, optionally, the first pressure dividing block 311 and the second pressure dividing block 312 are of detachable structures, and when the first pressure dividing block 311 or the second pressure dividing block 312 is damaged and needs to be replaced, it can be quickly replaced by unscrewing the bolts 321. If the first pressure dividing block 311 and the second pressure dividing block 312 are in an integral circular ring structure, when the structures of the first pressure dividing block 311 and the second pressure dividing block 312 are partially damaged and need to be replaced, it is difficult to disassemble them quickly, which is not conductive to replacement.

If the first pressure dividing block 311 and the second pressure dividing block 312 that are damaged are left for continued used, the compression effect on the disc-shaped sheath 220 may be unqualified, and further the waterproof sealing of the cable inner core 100 may be affected. If the whole circular ring structure is forcibly damaged, a new circular ring structure cannot be sleeved on the side surface of the elongated sheath 210, resulting in that the disc-shaped sheath 220 cannot be fastened by the fastening structure 300. If the waterproof sealing of the cable inner core 100 is ensured by replacing the whole structure, the production and manufacturing costs are greatly increased.

In some other embodiments of the present disclosure, a communication device is further provided. Referring to FIG. 1 to FIG. 4, the communication device may include the waterproof sealing structure for a cable provided according to the preceding embodiments of the present disclosure.

In the description of the present description, descriptions with reference to terms such as "one embodiment", "some embodiments", "example", "specific example", or "some examples" indicates that specific features, structures, materials or characteristics described in combination with this embodiment or example description are included in at least one embodiment or example of the present disclosure. In the present description, exemplary expressions of the above terms do not necessarily refer to the same embodiment or example. Moreover, the specific features, structures, materials or characteristics described can be combined in any appropriate manner in any one or more embodiments or examples. Besides, a person skilled in the art could incorporate and combine different embodiments or examples described in the present description and features of different embodiments or examples, without contradiction.

Although the embodiments of the present disclosure have been shown and described above, it could be understood that the above embodiments are exemplary, and should not be construed as limitation to the present disclosure, and those ordinarily skilled in the art could change, modify, substitute, and vary the above embodiments within the scope of the present disclosure.

INDUSTRIAL APPLICABILITY

The present disclosure provides a waterproof sealing structure for a cable and a communications device, including: a cable inner core, a cable sheath, fastening structures, and an actuating mechanism, wherein the cable sheath is molded by one-time pouring outside the cable inner core, the cable sheath includes an elongated sheath and disc-shaped sheaths, the disc-shaped sheaths are molded at the end portions of the elongated sheath, the end portions of the cable inner core are connected to the actuating mechanism, ends of the actuating mechanism connected to the cable inner core are open, and the disc-shaped sheaths are sealed and fastened at the open ends of the actuating mechanism through the fastening structures. The cable sheath wraps the cable inner core by one-time pouring, which can effectively avoid peeling off of the cable sheath in the environment with high hydraulic pressure and large temperature change of alternate cooling and heating, and the disc-shaped cable sheaths seal and isolate the actuating mechanism where the cable inner core is located, realizing the waterproof sealing of the whole side surface and the end portions of the cable inner core.

Besides, it may be understood that the waterproof sealing structure for a cable and the communication device in the present disclosure may be reproduced, and may be used in a variety of industrial applications. For example, the waterproof sealing structure for a cable and the communication device can be used in any cable field that needs water prevention.

What is claimed is:

1. A waterproof sealing structure for a cable, comprising: a cable inner core, a cable sheath, fastening structures, and an actuating mechanism, wherein the cable sheath is molded by one-time pouring outside the cable inner core, the cable sheath comprises an elongated sheath and disc-shaped sheaths, the disc-shaped sheaths are molded end portions of the elongated sheath, end portions of the cable inner core are connected to the actuating mechanism, ends of the actuating mechanism connected to the cable inner core are open, and the disc-shaped sheaths are sealed and fastened at the open ends of the actuating mechanism through the fastening structures.

2. The waterproof sealing structure for a cable according to claim 1, wherein each of the open ends of the actuating mechanism is provided with an annular groove matched with the corresponding disc-shaped sheath.

3. The waterproof sealing structure for a cable according to claim 2, wherein an annular sealing ring is molded on an end surface of the disc-shaped sheath opposite to the annular groove, and the annular sealing ring is configured to be in sealed contact and matched with an inner bottom surface of the corresponding annular groove.

4. The waterproof sealing structure for a cable according to claim 3, wherein a thickness of the disc-shaped sheath is greater than a depth of the annular groove.

5. The waterproof sealing structure for a cable according to claim 3, wherein the fastening structures each comprise a pressing block and a bolt assembly, and the pressing blocks are configured to be fixed to the open ends of the actuating mechanism through the bolt assemblies, to realize compression to the disc-shaped sheaths.

6. The waterproof sealing structure for a cable according to claim 2, wherein the fastening structures each comprise a pressing block and a bolt assembly, and the pressing blocks are configured to be fixed to the open ends of the actuating mechanism through the bolt assemblies, to realize compression to the disc-shaped sheaths.

7. The waterproof sealing structure for a cable according to claim 6, wherein the pressing block comprises a first pressure dividing block and a second pressure dividing block detachably matched and connected with each other, and the first pressure dividing block and the second pressure dividing block are both configured to be fixed at the open end of the actuating mechanism through the bolt assembly.

8. The waterproof sealing structure for a cable according to claim 7, wherein the first pressure dividing block and the second pressure dividing block are configured to form a complete circular ring structure, and the cable sheath is configured to be clamped by the first pressure dividing block and the second pressure dividing block.

9. The waterproof sealing structure for a cable according to claim 8, wherein end surfaces of the first pressure dividing block and the second pressure dividing block are equidistantly provided with three screw holes in a semi-circumferential direction of 180°, wherein two of the three screw holes are located at positions where the first pressure dividing block and the second pressure dividing block are lap jointed and overlap each other, and the two screw holes where the first pressure dividing block and the second pressure dividing block are lap jointed and overlap each other have same axis.

10. The waterproof sealing structure for a cable according to claim 7, wherein the first pressure dividing block and the second pressure dividing block are configured to form a complete circular ring structure, so as to clamp the elongated sheath between the first pressure dividing block and the second pressure dividing block, wherein end surfaces of the first pressure dividing block and the second pressure dividing block contact and are matched with an opposite end surface of the disc-shaped sheath.

11. The waterproof sealing structure for a cable according to claim 7, wherein end surfaces of the first pressure dividing block and the second pressure dividing block are equidistantly provided with three screw holes in a semi-circumferential direction of 180°, wherein two of the three screw holes are located at positions where the first pressure dividing block and the second pressure dividing block are lap jointed and overlap each other, and the two screw holes where the first pressure dividing block and the second pressure dividing block are lap jointed and overlap each other have same axis.

12. The waterproof sealing structure for a cable according to claim 7, wherein the first pressure dividing blocks and the second pressure dividing blocks are of detachable structures.

13. The waterproof sealing structure for a cable according to claim 6, wherein the bolt assembly comprises four bolts, and end surfaces of the pressing blocks and end surfaces of the open ends of the actuating mechanism are respectively provided with screw holes, the bolts pass through the screw holes to fix the pressing blocks with the actuating mechanism, and meanwhile, the pressing blocks fix the disc-shaped sheaths in the respective annular grooves.

14. The waterproof sealing structure for a cable according to claim 7, wherein the bolt assembly comprises four bolts, and end surfaces of the pressing blocks and end surfaces of the open ends of the actuating mechanism are respectively provided with screw holes, the bolts pass through the screw holes to fix the pressing blocks with the actuating mechanism, and meanwhile, the pressing blocks fix the disc-shaped sheaths in the respective annular grooves.

15. The waterproof sealing structure for a cable according to claim 1, wherein the cable sheath is made of an elastic PUR material.

16. The waterproof sealing structure for a cable according to claim 1, wherein the actuating mechanism comprises a control cabin and an actuator, and an end of the control cabin and an end of the actuator are open; the cable inner core penetrates through the cable sheath, and the cable inner core has one end located in the control cabin, and the other end located in the actuator; and the fastening structures sealedly secure the cable sheath in the control cabin and the actuator.

17. The waterproof sealing structure for a cable according to claim 16, wherein the fastening structures secure end portions of the cable sheath at the open ends of the control cabin and the actuator, respectively; and two ends of the cable inner core penetrating out of the end portions of the cable sheath are inserted into the control cabin and the actuator, respectively.

18. The waterproof sealing structure for a cable according to claim 17, wherein the fastening structures are arranged outside the end surfaces of the disc-shaped sheaths, and the fastening structures are configured to be in close contact and matched with the end surfaces of the disc-shaped sheaths, so that the end surfaces of the disc-shaped sheaths away from the fastening structures are tightly attached to the end surfaces of the control cabin and the actuator.

19. The waterproof sealing structure for a cable according to claim 16, wherein a diameter of each of the disc-shaped sheaths is greater than a diameter of the elongated sheath; and a distance between the end surface of the disc-shaped sheath and a corresponding end portion of the cable inner core is greater than a distance between an end surface of the elongated sheath and the corresponding end portion of the cable inner core.

20. A communication device, comprising the waterproof sealing structure for a cable according to claim 1.

* * * * *